June 20, 1967  L. J. LEWIS  3,326,205

SPOON FOR EXTRACTING LIQUID FROM EGGS

Filed Aug. 21, 1964

INVENTOR.
L. JAMES LEWIS
BY Charles P. Fay,
atty, 3,326,205
SPOON FOR EXTRACTING LIQUID FROM EGGS
L. James Lewis, Delmar, N.Y., assignor to Sterling Drug Inc., New York, N.Y., a corporation of Delaware
Filed Aug. 21, 1964, Ser. No. 391,212
1 Claim. (Cl. 128—1)

This invention relates to a new and improved implement which may be referred to as a "spoon," the object of which is to provide for the removal of allantoic liquid from egg embryos for the manufacture of egg embryo-adapted vaccines.

The object of the invention is to provide for the relatively easy removel of the liquid from the egg embryo while preventing the embryo or other particulate matter from being drawn into the tube so that such embryo or similar matter is not drawn up through the tube nor can it block the tube, to the end that the liquids are removed from the egg shell much easier and faster.

A further object of the invention resides in the provision of a device of the class described which includes a tube through which the liquids are removed to any desired point, the tube terminating in a spoon-like member which is hollow and has two coextensive, connected walls, one of which is smooth and imperforate and the other wall being foraminous or perforated or in fact being the form of a mesh or screen, the imperforate wall facing the interior of the egg, and the perforated wall being placed facing the shell, whereby liquids in the egg pass into the chamber formed by the space between the walls, and thence into the tube and out of the egg without however allowing the embryo itself or any other particulate matter from being drawn through or blocking the tube, since the non-liquid matter tends to impinge on the imperforate wall and not the perforate wall.

Other objects and advantages of the invention will appear hereinafter.

Reference is to be had to the accompanying drawings in which.

Figure 1:
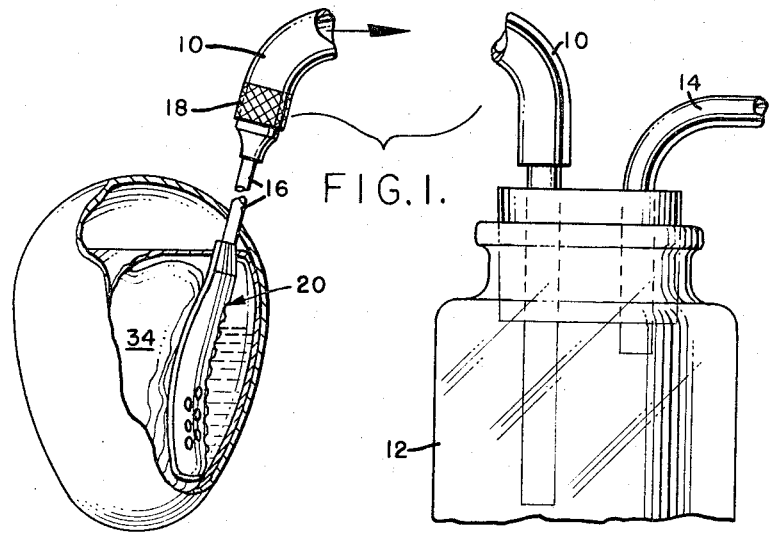
FIG. 1 is a view in elevation, partly in section, illustrating the use of the new implement in withdrawing liquid from eggs.

In carrying out the invention there is provided a tube 10 which is preferably flexible in the form of a hose and can be made of rubber, plastic or glass as well as suitable metals. This hose is directed into a container 12 and the contents of the tube are intended to flow in the direction of the arrow in FIG. 1 into the container. This container is also provided with a connection 14 to a source of negative pressure for the purpose of carrying the liquid in the direction indicated to be deposited in the container 12.

A preferably rigid tube 16 is provided with any kind of hub or connection generally indicated at 18 to which the hose 10 is connected, and at its opposite end the tube 16 is provided with a hollow spoon-like implement generally indicated by the reference character 20.

Figure 2:
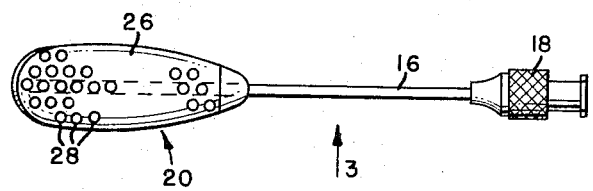
FIG. 2 is a view in elevation illustrating the new implement.
Figure 3:
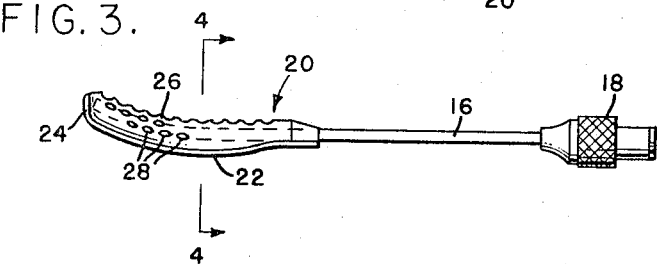
FIG. 3 is a side view thereof, looking in the direction of arrow 3 in FIG. 2.
Figure 4:
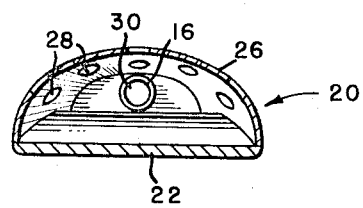
FIG. 4 is a section on an enlarged scale on the line 4—4 of FIG. 3.

This implement comprises an imperforate smooth-surfaced, elongated, ovate wall 22 which is curved on transverse axes as seen in FIGS. 1 and 3 and presents a smooth outer surface. This wall can be turned up at its end as at 24 to provide an entering wedge or the like. Anchored to the edges of the wall 22 there is a foraminous wall or a mesh, screen or the like generally indicated at 26. This mesh, screen or the like conforms somewhat to the shape of the wall 22 as shown in FIGS. 2 and 3, but is transversely curved on longitudinal axes, see FIG. 4. This provides a chamber between the mesh or screen 26 and the wall 22, this chamber being completely closed except for the apertures 28 in the mesh or screen and the opening at 30 to the tube 16. It is to be observed that preferably the entire surface of the member 26 is provided with openings and these openings are of a size commensurate with the objects of the invention, i.e., to prevent the embryo for instance in the area at 34 in FIG. 1 from entering the chamber between the mesh 26 and wall 22. The screen also prevents other particulate matter from entering the same and therefore it will be seen that the tube 16 cannot become clogged and the liquid that is desired to be withdrawn into the container 12 is so withdrawn easily and continuously.

In FIG. 1 it is shown how a hole may be provided in the shell of an egg and the implement thrust thereinto with the exposed surface of wall 22 in general facing the allantoic cavity (or the amnionic cavity) for the purpose of extracting liquids through the apertures 28 while still preventing the embryo and other matter from being withdrawn. Therefore the liquid egg contents can be easily withdrawn by suction into the container 12 and then used as desired, and such liquid will be in substantially pure condition without having any particulate matter therein which of course would have to be removed later on.

Having thus described my invention and the advantages thereof, I do not wish to be limited to the details herein disclosed, otherwise than as set forth in the claim, but what I claim is:

An implement for extracting liquids from eggs comprising a tube, said tube being open at both ends, means for attaching a vacuum tube at one end of said tube and a spoon-like implement attached at the opposite end of said tube, said spoon-like implement comprising an imperforate wall of elongated shape in the direction of the axis of the tube, and a foraminous wall secured at the edges thereof to said imperforate wall, said foraminous wall being in general coextensive therewith and at least in part spaced therefrom forming a chamber between the imperforate and the foraminous wall, said chamber being closed except for the foraminous wall openings and the entrance to the tube, the curve in the perforate wall being concave for inserting the spoon-like member in an egg with the imperforate wall facing the interior of the egg and the foraminous wall facing the eggshell while receiving liquids into said chamber.

References Cited
UNITED STATES PATENTS 2,597,966  5/1952  Adler _____ 128—67
2,950,533  8/1960  Sommerstein _____ 32—33

RICHARD A. GAUDET, Primary Examiner.
S. BRODER, Assistant Examiner.